United States Patent
Hwang

(10) Patent No.: US 9,215,308 B2
(45) Date of Patent: Dec. 15, 2015

(54) MOBILE TERMINAL AND CONTROL METHOD THEREOF

(75) Inventor: Keumsung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 13/332,316

(22) Filed: Dec. 20, 2011

(65) Prior Publication Data

US 2012/0290680 A1 Nov. 15, 2012

(30) Foreign Application Priority Data

May 11, 2011 (KR) .......................... 10-2011-0043745

(51) Int. Cl.
*G06F 15/16* (2006.01)
*H04M 1/725* (2006.01)
*G06F 9/54* (2006.01)

(52) U.S. Cl.
CPC .............. *H04M 1/7253* (2013.01); *G06F 9/54* (2013.01); *G06F 2209/549* (2013.01)

(58) Field of Classification Search
USPC ........................... 709/217; 455/466; 707/728
See application file for complete search history.

(56) References Cited

U.S. PATENT DOCUMENTS

| | | | | |
|---|---|---|---|---|
| 8,156,116 | B2* | 4/2012 | Graham | G06F 17/30035 705/14.4 |
| 8,209,233 | B2* | 6/2012 | Reber | 705/26.1 |
| 8,626,210 | B2* | 1/2014 | Hicks, III | G08B 25/001 340/506 |
| 2009/0111453 | A1* | 4/2009 | Hsu | G06F 8/61 455/419 |
| 2011/0029334 | A1* | 2/2011 | Reber | A63F 13/005 705/5 |
| 2012/0185569 | A1* | 7/2012 | Das et al. | 709/219 |

FOREIGN PATENT DOCUMENTS

EP 1591909 11/2005

* cited by examiner

*Primary Examiner* — Tammy Nguyen
(74) *Attorney, Agent, or Firm* — Lee, Hong, Degerman, Kang & Waimey

(57) ABSTRACT

Disclosed are a mobile terminal and a control method thereof. The mobile terminal includes a radio communication unit, a memory storing one or more applications each including one or more tasks, and a controller performing a specific operation corresponding to the one or more tasks and generating at least one stack by placing in turn the one or more tasks on top of one another. The at least one stack is sent to at least one another electronic device through the radio communication unit such that a task included in the stack is executed in the at least one another electronic device. The stack generated by the mobile terminal can share the stack with another electronic device.

11 Claims, 17 Drawing Sheets

FIG. 6
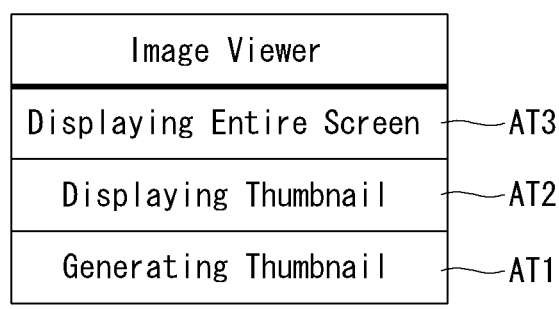
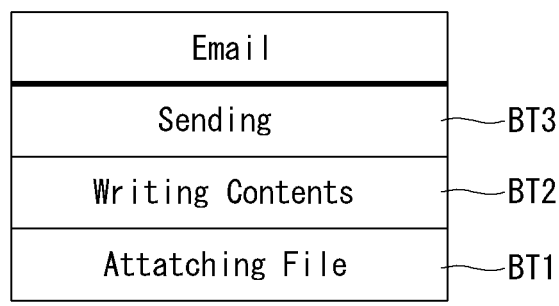

FIG. 8
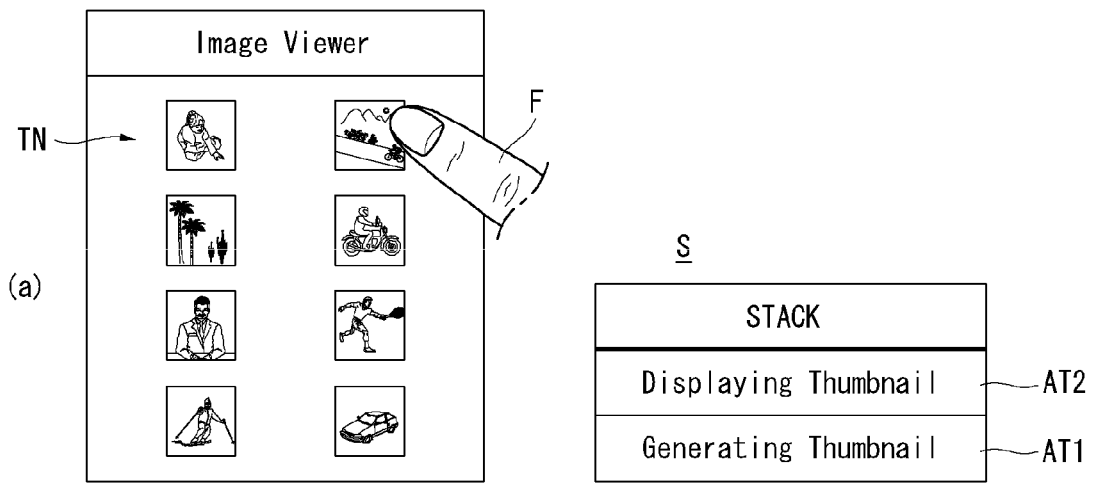
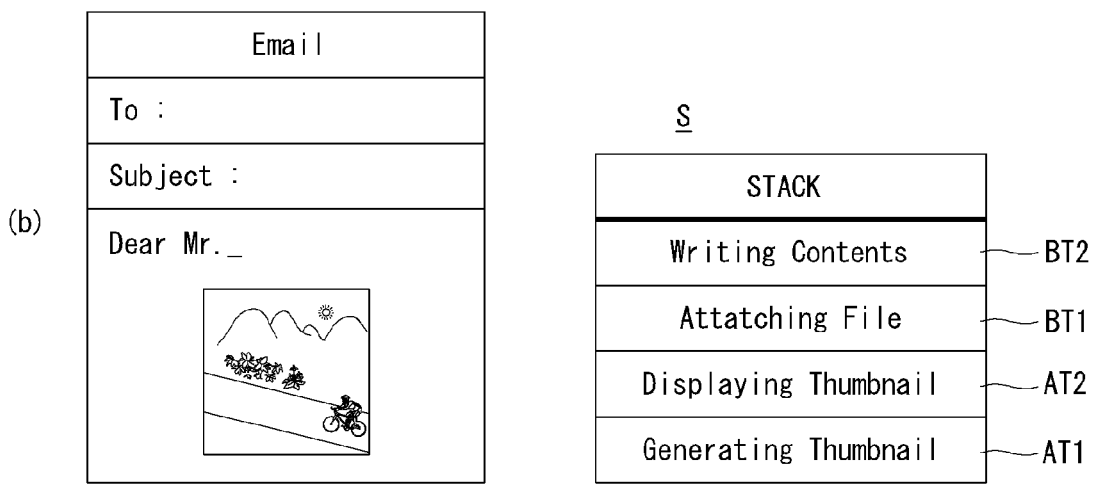

FIG. 9
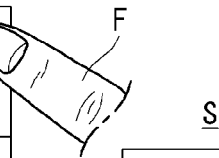
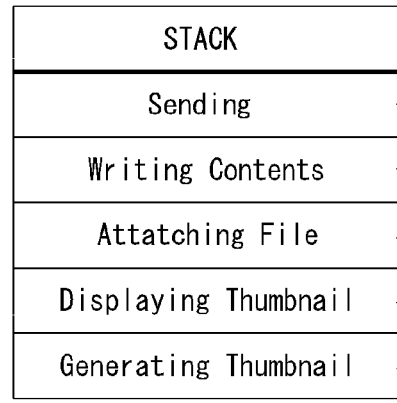
(a)
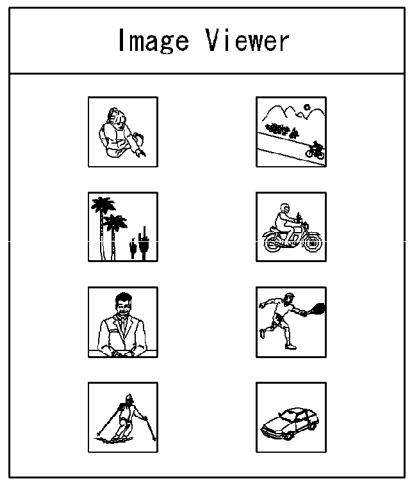
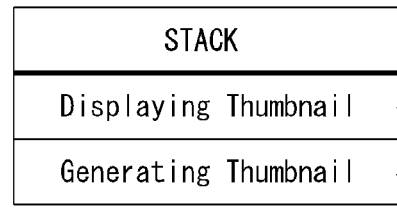
(b)

FIG. 11
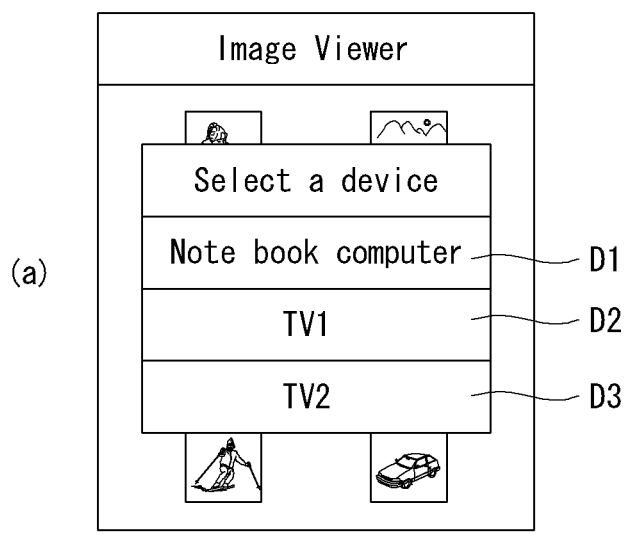
(a)
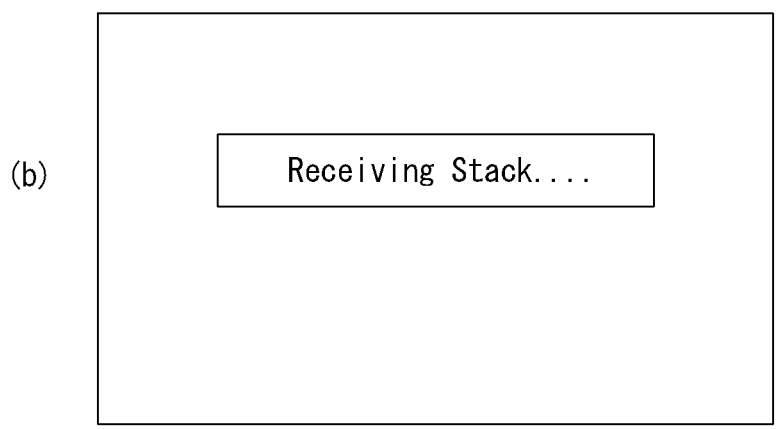
(b)

FIG. 12
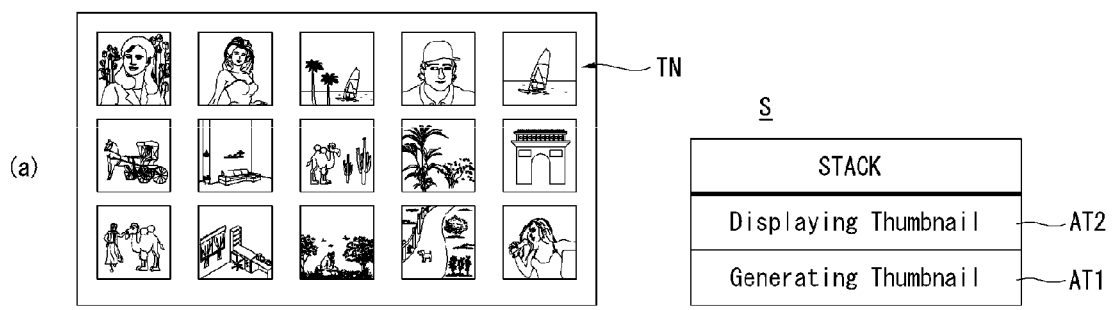
(a)
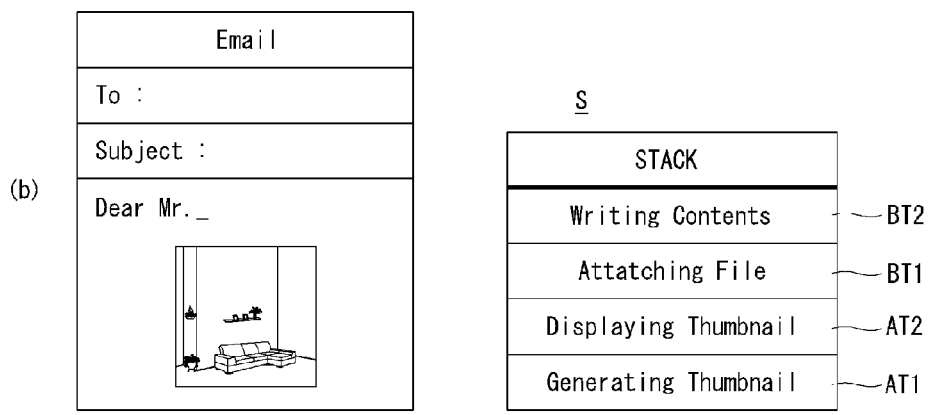
(b)

FIG. 13
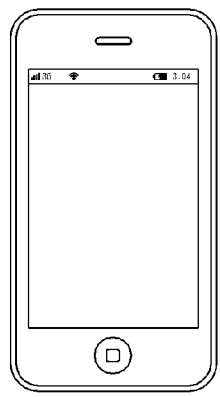
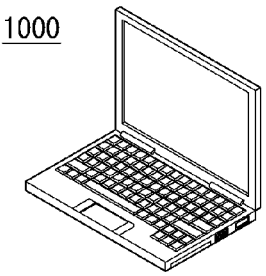
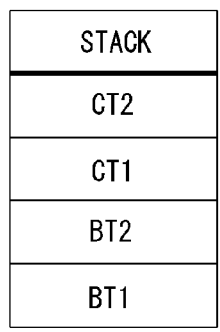
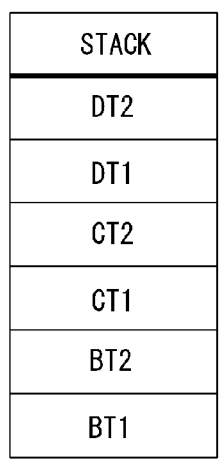
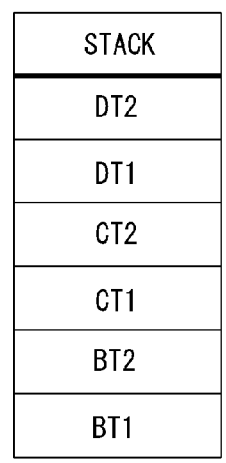

FIG. 14
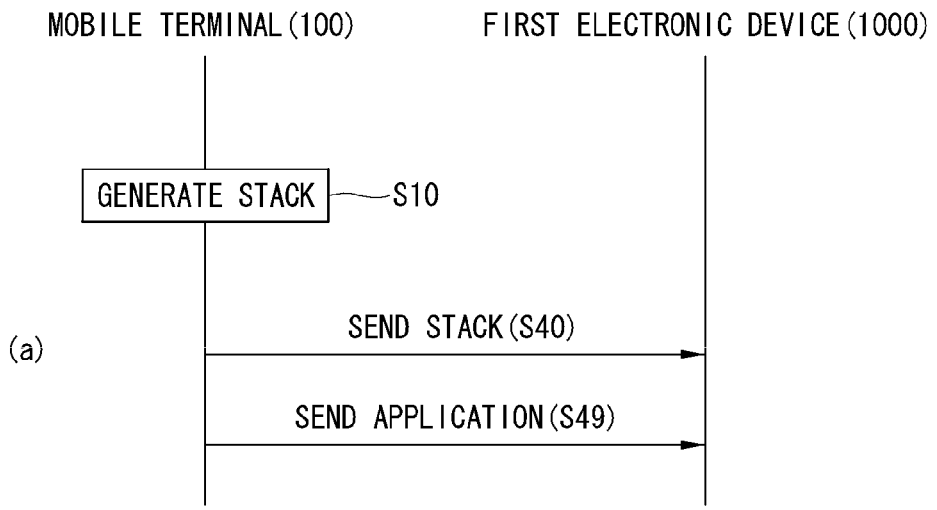
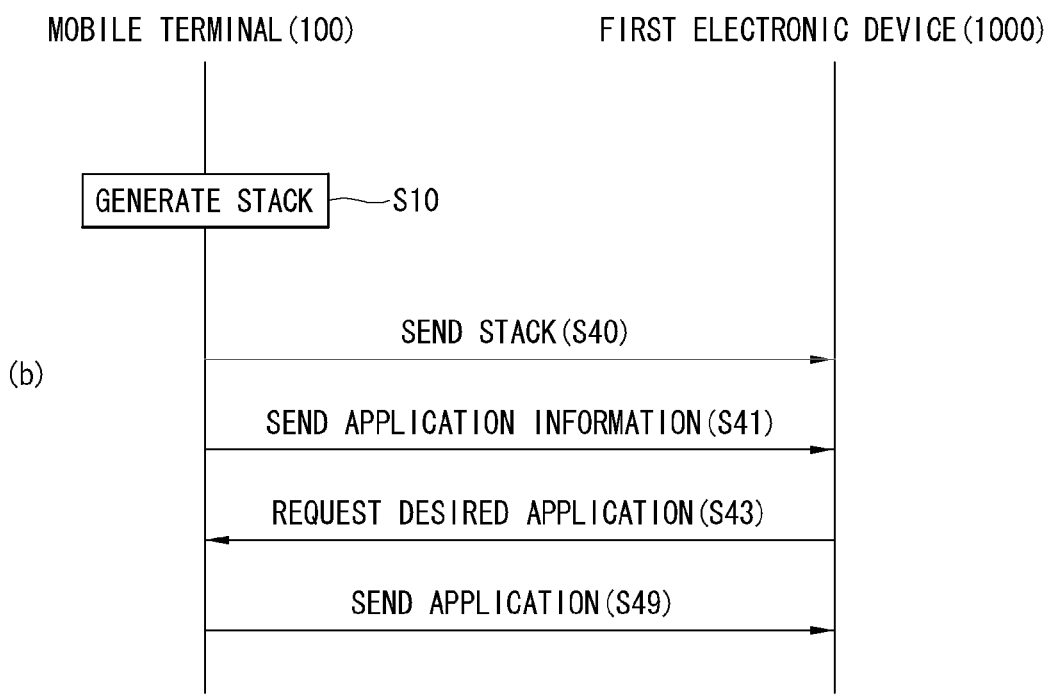

FIG. 17
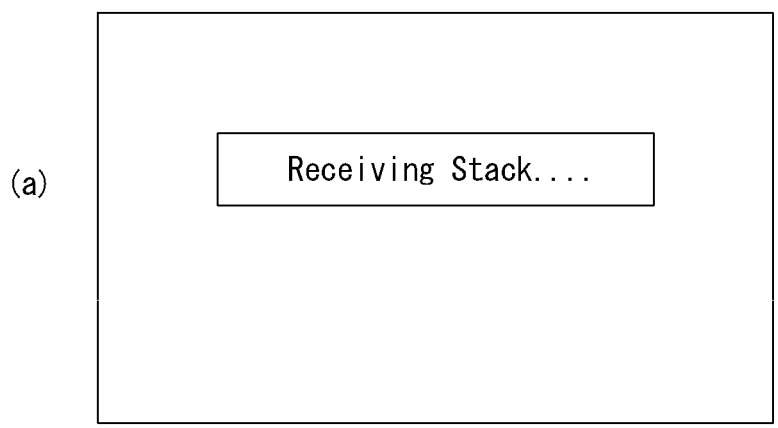
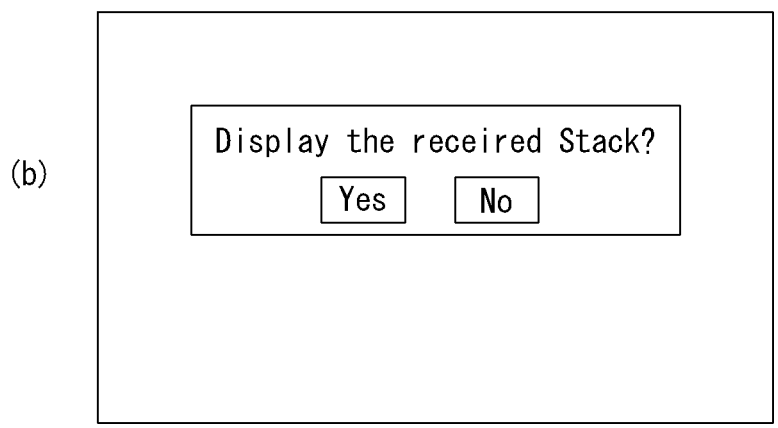

FIG. 18
(a)
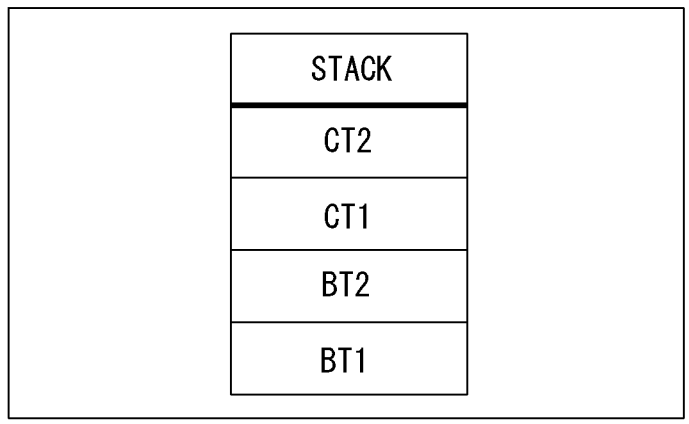
(b)
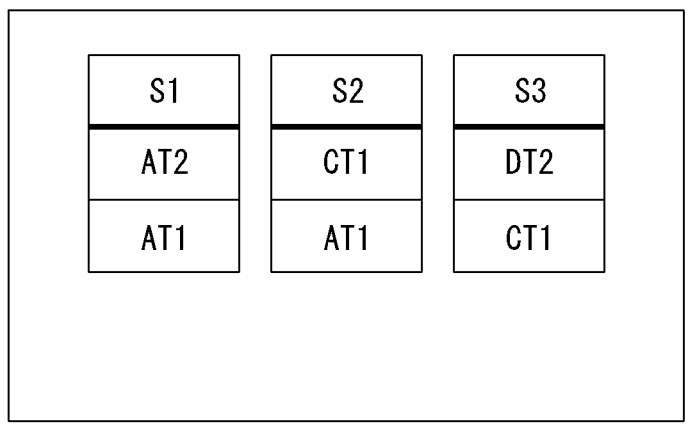

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0043745, filed on May 11, 2011, the contents of which is hereby incorporated by reference herein in its entirety.

BACKGROUND

1. Field

The present invention relates to a mobile terminal and a control method thereof, and more particularly, to a mobile terminal capable of sharing a produced stacked with another electronic device, and a control method thereof.

2. Related Art

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

Accordingly, one object of the present invention is to address the above-noted and other drawbacks of the related art.

Another object of the present invention is to provide a mobile terminal capable of sharing a produced stack with another electronic device, and a control method thereof.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a view illustrating a task of an application of the mobile terminal illustrated in FIG. 1;

FIGS. 7 through 9 are views illustrating a change in a stack according to an operation of the mobile terminal illustrated in FIG. 1;

FIGS. 11 through 12 are views illustrating operation according to stack exchange between the mobile terminal illustrated in FIG. 1 and another electronic device;

FIG. 13 is a view illustrating a process of making a stack in another electronic device, which follows receiving a stack from the mobile terminal illustrated in FIG. 1, and then sending the stack back to the mobile terminal;

FIGS. 14 and 15 are views illustrating relationship between the mobile terminal of FIG. 1 and another electronic device in terms of the transmission of an application;

FIGS. 17 through 18 are views illustrating another electronic device displaying a stack being received.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
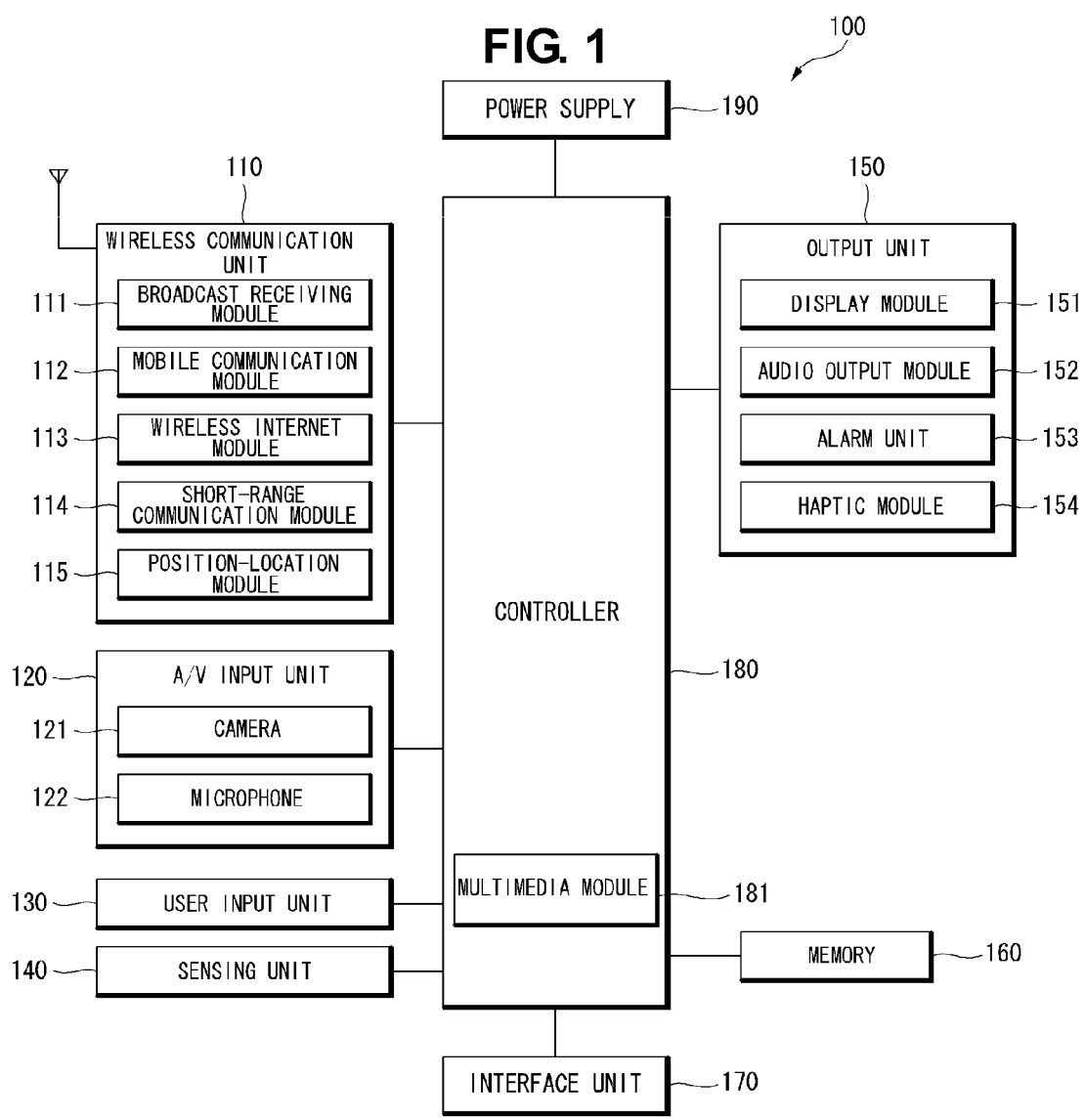
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or ZigBee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
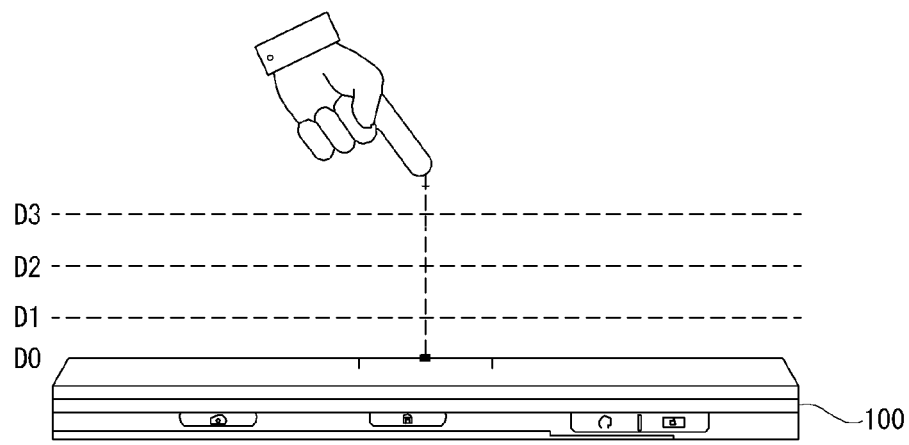
FIG. 2 is a conceptional view for explaining a proximity depth of a proximity sensor.

FIG. 2 is a conceptional view for explaining a proximity depth of the proximity sensor.

As shown in FIG. 2, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 2 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 3:
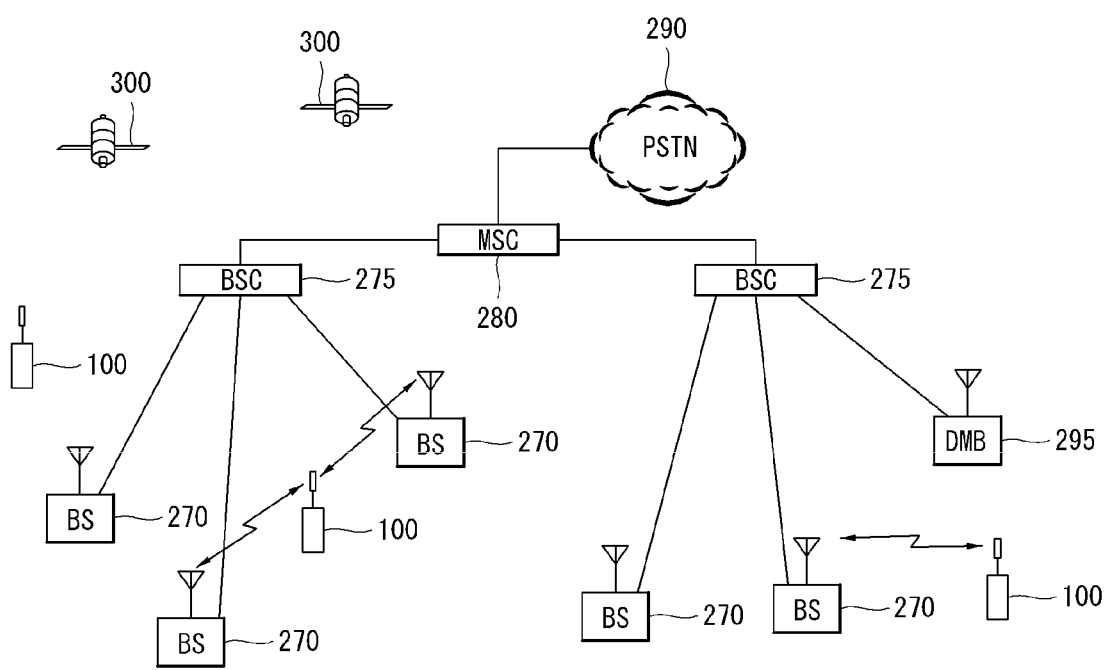
FIG. 3 illustrates a configuration of a CDMA wireless communication system communicating with the mobile terminal shown in FIG. 1.

Referring to FIG. 3, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 3 illustrates global positioning system (GPS) satellites 300. These satellites 300 can track the positions of some or all of the mobile terminals 100. Although two satellites are shown in FIG. 3, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 4:
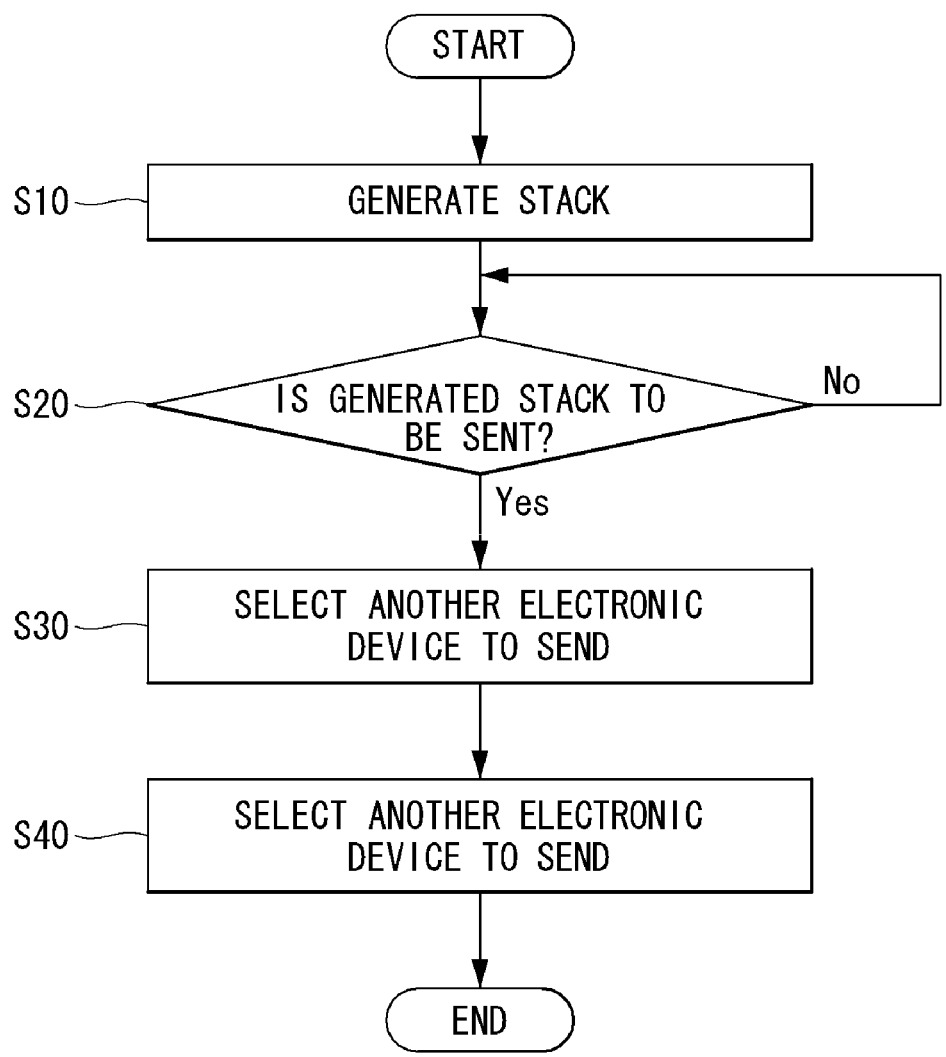
FIG. 4 is a flowchart illustrating an operational process of a mobile terminal according to an embodiment of the present invention.

FIG. 4 is a flowchart illustrating an operation process of a mobile terminal according to an embodiment of the present invention.

As shown therein, a controller (180 in FIG. 1) of the mobile terminal 100 according to an embodiment of the present invention may cause a stack to be generated in operation S10.

The stack may be one type of structure of pushing (placing) data on a stack. As the data push structure, there may be a stack type and a queue type. The stack employs a First-In Last-Out data structure, and the queue may be a First-In First-Out data structure.

The controller 180 may add each task of an application being executed to a stack. The application may consist of a plurality of tasks. A task may be a function unit modularized to execute a specific application. For example, an image viewer application may include a task of generating a thumbnail image for image data stored in a memory (160 in FIG. 1), a task of displaying the generated thumbnail image, a task of displaying a selected specific thumbnail image on an entire screen.

Each task is modularized, and when the task is executed, it may be sequentially added to a stack. The process of pushing (adding) and popping (removing) a task may be described as follows by using the process of displaying an image and sending the displayed image via e-mail as an example. When a thumbnail image is displayed, a thumbnail image displaying task may be added to the bottom of the stack. Thereafter, when an e-mail is written after the selection of a thumbnail image, an e-mail writing task may be added next. When the e-mail writing task is completed, it may be popped (removed) from the stack. Once the e-mail writing task is removed, the thumbnail image displaying task in the stack may be executed. The pop and push of a task will be described later in detail.

Once a stack is created, it may be determined whether to send the created stack in operation s20, another electronic device may be selected to send the created stack in operation S30, and the created stack may be sent to the selected electronic device in operation S40.

The created stack may be sent to another electronic device. That is, this means that the stack may be sent to another electronic device other than the mobile terminal 100. In the related art, a stack is used solely by the mobile terminal 100. However, the mobile terminal 100 according to an embodiment of the present invention may send a stack to another electronic device and receive the stack from another electronic device, thus performing an associated operation. For example, the mobile terminal 100 may perform the first half of operation A and then send the stack to another electronic device. Then, another electronic device receiving the stack may the second half of the operation and then resend the stack to the mobile terminal 100. Accordingly, in a situation where a user wants a bigger screen or the mobile terminal 100 cannot perform a specific operation, a required operation may be continuously performed by another electronic device.

Figure 5:
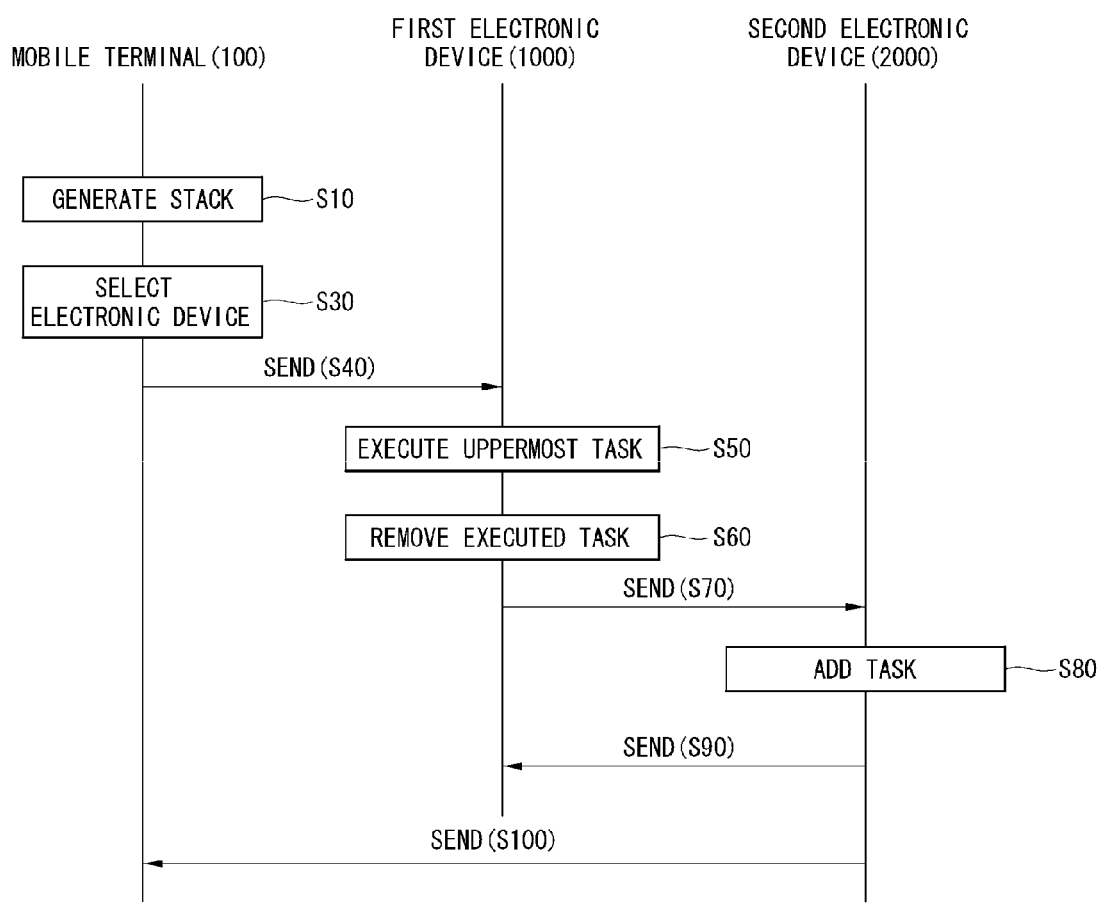
FIG. 5 is a signal flow graph illustrating signal relationship between the mobile terminal shown in FIG. 1 and another electronic device.

FIG. 5 is a signal flow graph illustrating signal relationship between the mobile terminal illustrated in FIG. 1 and another electronic device.

As shown therein, the mobile terminal 100 according to an embodiment of the present invention may create a stack in operation S10, and select a specific electronic device in operation S30.

When a specific electronic device is selected, a stack may be sent to a first electronic device 1000, which is the specific electric device, in operation S40.

The first electronic device 1000 receiving the stack may execute the uppermost task among tasks included in the stack in operation S50.

The uppermost task may be a task on the very top of the stack among tasks included in the stack. The controller 150 of FIG. 1 may in turn execute tasks from the uppermost task.

The executed task may be removed from the memory 160 of FIG. 1 in operation S60.

The first electronic device 100 executing the specific task of the stack may send the stack to a second electronic device 2000 in operation S70.

The second electronic device 2000 receiving the stack may additionally perform an operation of adding a task to the stack in operation S80. This means that, for example, the second electronic device 2000 may perform a new application.

The second electronic device 2000 may send the received stack, now including an associated task, back to the first electronic device 100 and/or the mobile terminal 100 in operation S100.

While the stack is sent between the mobile terminal 100 and the first and second electronic devices 1000 and 2000, a task may be added (pushed) to the stack or an existing task may be removed (popped) from the stack. This means that the push and pop operation for a stack, which was performed solely by a specific device in the related art, can now be performed by different electronic devices. Thus, a user is allowed to effectively use a function, which was manipulated only by the mobile terminal 100, now in another electronic device.

FIG. 6 is a view illustrating tasks for applications in the mobile terminal illustrated in FIG. 1.

As shown in the drawing, first and second applications A and B may be stored in the memory 160 of FIG. 1 of the mobile terminal 100 according to an embodiment of the present invention.

The first application A may be an image viewer application, and the second application B may be an e-mail application. Hereinafter, the case where the applications are image viewer and e-mail applications is used by way of example to assist with understanding the embodiment, but it is appreciated that applications executed or stored in the memory 160 of FIG. 1 of the mobile terminal according to an embodiment of the present invention of the present invention are not limited thereto.

The first application A may include a task AT1 of generating a thumbnail, a task AT2 of displaying the thumbnail, and a task AT3 of displaying an entire screen. The second application B may include a task BT1 of enclosing a file, a task BT2 of writing contents, and a task BT3 of sending an e-mail.

Each task included in each of the applications A and B may be stored in a stack when another related task is executed while a function corresponding to the each task is being executed. In such a manner, a plurality of tasks may be pushed in turn into the stack. A pushed task may be removed from the stack once a function associated with the task is terminated. Once the task on the top of the stack is removed, a function associated with a task below the removed task may be executed.

Figure 7:
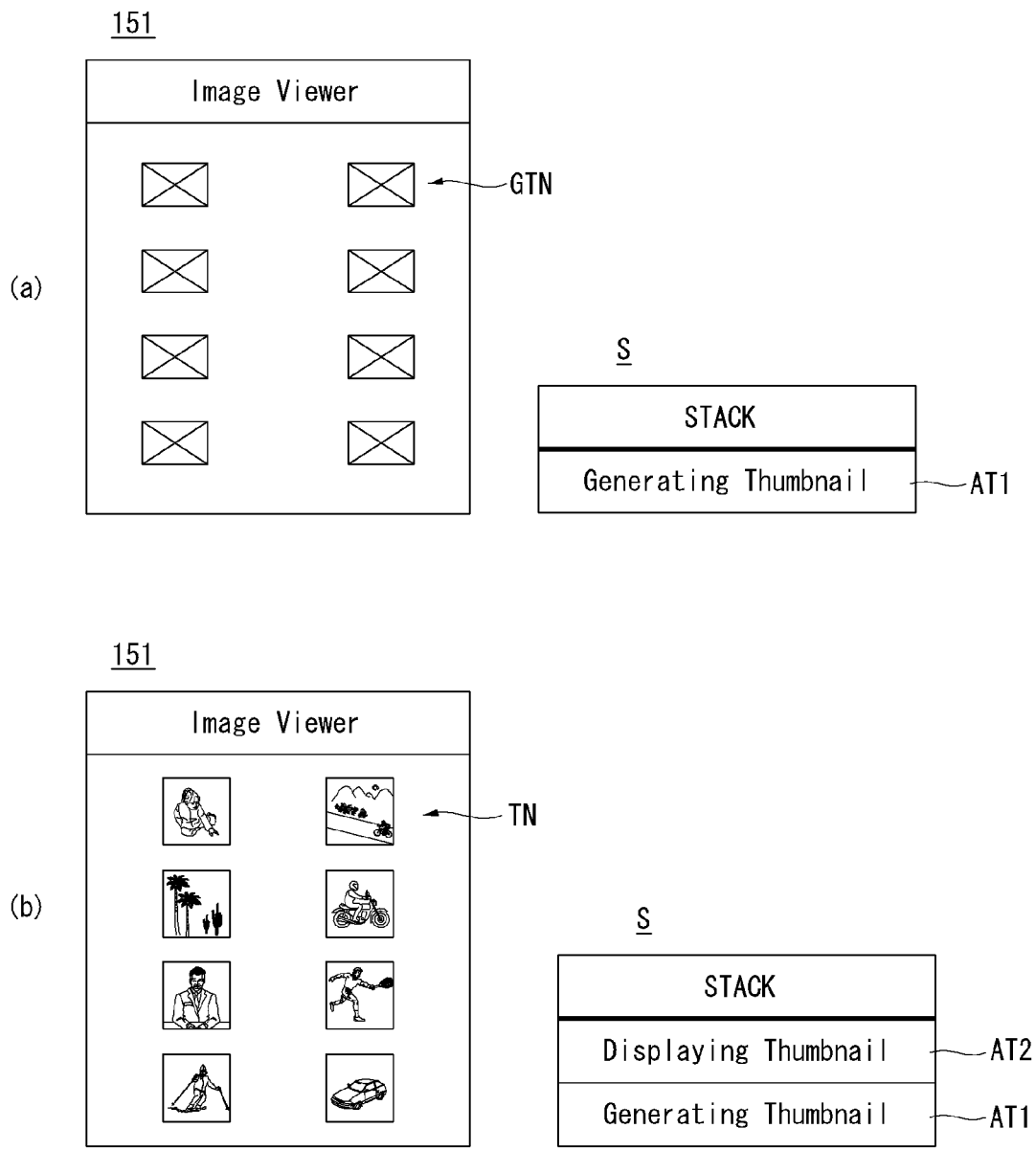

FIGS. 7 through 9 are views illustrating changes in a stack according to the operation of the mobile terminal illustrated in FIG. 1.

As shown in the drawings, in the mobile terminal 100 according to an embodiment of the present invention, a task may be added to ore removed from a corresponding stack S according to the execution of a function.

As shown in FIG. 7(*a*), an image viewer application may be executed. The image viewer application, when executed, may display thumbnails. The thumbnails may need to be generated first to be displayed. Accordingly, a task AT1 of generating thumbnails is added to the stack S, and an operation for generating thumbnails may be carried out. Transient thumbnails GTN may be displayed until the thumbnails are generated.

As shown in FIG. 7(*b*), once the thumbnails are generated, a task AT2 of displaying thumbnails is added next to the stack, and the generated thumbnails TN may be displayed on the display 151.

As shown in FIG. 8(*a*), a user may select a specific thumbnail among the thumbnails TN with a finger F or the like.

As shown in FIG. 8(*b*), once the specific thumbnail TN is selected, a task BT1 of attaching the thumbnail TN to an e-mail and a task BT2 of writing contents of the e-mail may be carried out. The tasks being carried out may be added in turn to the stack S.

As shown in FIG. 9(*a*), when a user selects to transmit the e-mail, a task BT3 of sending an e-mail is added to the stack and executed.

As shown in FIG. 9(*b*), once the transmission of the e-mail is completed, tasks associated with the e-mail may be removed in turn from the stack. When a task is removed, functions associated with remaining tasks may be displayed on the display 151. That is, in the case of FIG. 9(*b*), since a task on the top of the stack is the task AT2 of displaying thumbnails, the controller 150 of FIG. 1 may display the thumbnail on the display 151.

A stack may include a history of an application that the mobile terminal 100 has performed. That is, the stack may indicate that a specific application, although not currently being executed, was performed in the past. Thus, an electronic device receiving the stack may perform an operation that was performed in the past by the mobile terminal 100.

Figure 10:
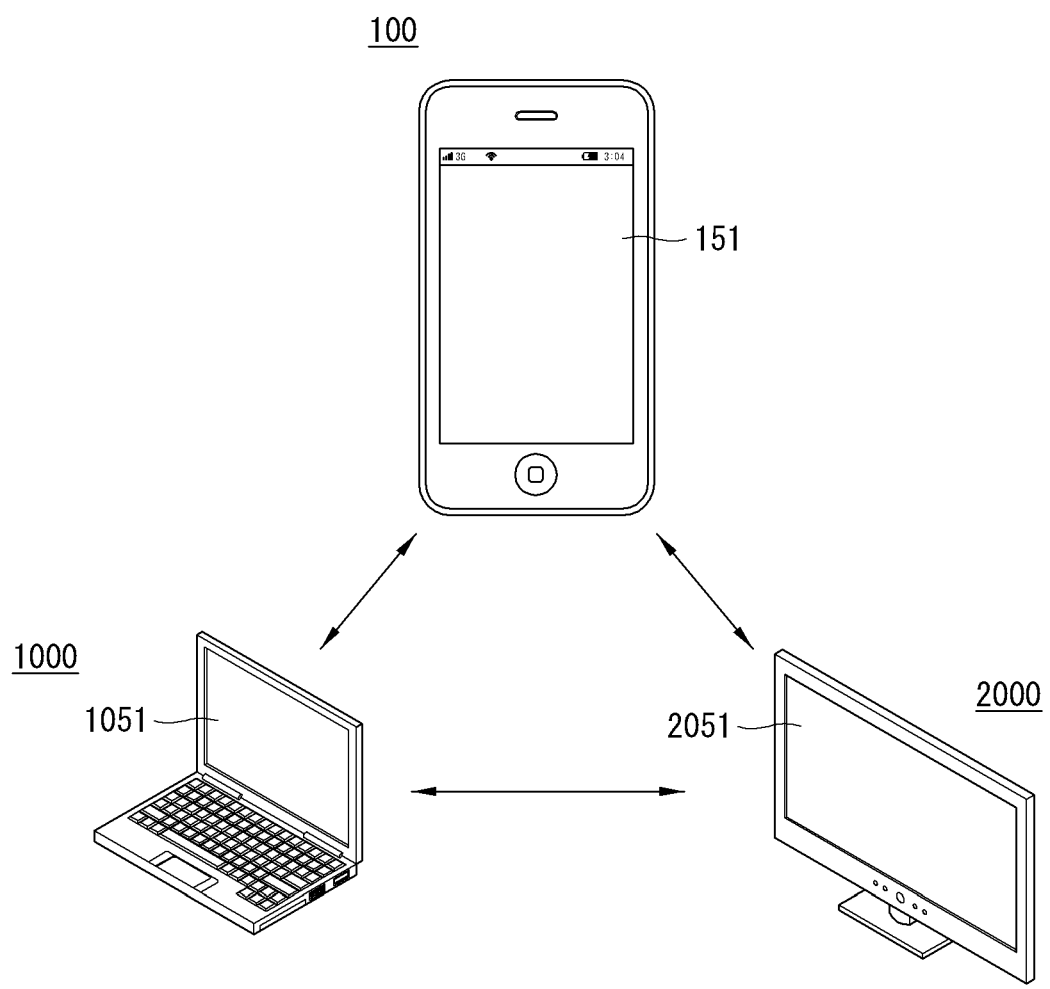
FIG. 10 is a view illustrating relationship between the mobile terminal illustrated in FIG. 1 and another electronic device.

FIG. 10 is a view illustrating relationship between the mobile terminal of FIG. 1 and another electronic device.

As shown therein, the mobile terminal 100 according to an embodiment of the present invention may exchange a stack while communicating with other electronic devices 1000 and 2000. This means that, for example, a stack generated in the mobile terminal 100 may be sent to the first electronic device 100, a notebook computer, or to the second electronic device 200, which is a TV. Furthermore, the mobile terminal 100 may receive a stack from the first and second electronic devices 1000 and 2000.

Authentication procedure between the mobile terminal 100 and the first and second electronic devices 1000 and 2000 may be carried out. The authentication procedure may be performed once in the beginning or may be repeatedly performed each time connection is established.

FIGS. 11 through 12 are views illustrating an operation according to stack exchange between the mobile terminal illustrated in FIG. 1 and another electronic device.

As shown therein, the mobile terminal 100 according to an embodiment of the present invention, while exchanging a stack with another electronic device, may display a related screen.

As shown in FIG. 11(*a*), the controller 180 of FIG. 1 of the mobile terminal 100 may display on the display 151*a* popup window allowing for checking which electronic device a stack is to be sent to. Other electronic devices that the mobile terminal 100 can send a stack may be displayed in the popup window.

As shown in FIG. 11(*b*), a display 151 of a second electronic device (2000 of FIG. 10), among other electronic devices, may display an image indicating that the stack is being received from the mobile terminal 100.

As shown in FIG. 12(*a*), the task AT2 of displaying thumbnails may be at the top of a stack S received from the mobile terminal 100. The controller of the second electronic device may perform the task AT2 of displaying thumbnails. Accordingly, thumbnails TN may be displayed on a display 1051 of the second electronic device. In this case, the thumbnails being displayed may be images in a memory of the second electronic device or images in memories of the mobile terminal 1000 and the second electronic device.

A user select a specific thumbnail TNS among selected thumbnails TN. When the user selects the specific thumbnail TNS, a function of sending the thumbnail TNS in an e-mail may be executed. The controller of the second electronic device may resent the mobile terminal 100 the stack S from which the selection on the thumbnail TNS has been made.

As shown in FIG. 12(*b*), the mobile terminal 100 receiving the stack S may perform an associated function such as attaching a file and writing an e-mail.

FIG. 13 is a view illustrating a process of making a stack in another electronic device, which follows receiving a stack from the mobile terminal illustrated in FIG. 1, and then sending the stack back to the mobile terminal.

As shown therein, the mobile terminal 100 according to an embodiment of the present invention may exchange a stack with the first electronic device 1000.

As shown in FIG. 13(*a*), the mobile terminal 100 may generate a stack S and perform associated functions. Tasks are illustrated herein as BT1 to CT2 for ease of description. The mobile terminal 100 may send the stack S to the first electronic device 1000.

As shown in FIG. 13(*b*) the first electronic device 1000 receiving the stack S may perform functions associated with the stack S and add a task to the stack.

As shown in FIG. 13(c), the first electronic device 1000, while performing associated functions, may add tasks to the stack.

As shown in FIG. 13(d), the first electronic device 100 may send the changed stack to the mobile terminal 100.

While the stack S is sent from the mobile terminal 100 to the first electronic device 100 and resent to the mobile terminal 100, a function unavailable for a specific electronic device may be performed. For example, a camera may not exist or may be broken in the mobile terminal 100. In this case, to carry out a function associated with picture taking, the stack S may be sent to the normally operating first electronic device 1000. The first electronic device 1000 may execute an associated function such as picture taking, and then send the stack back to the mobile terminal.

Figure 15:
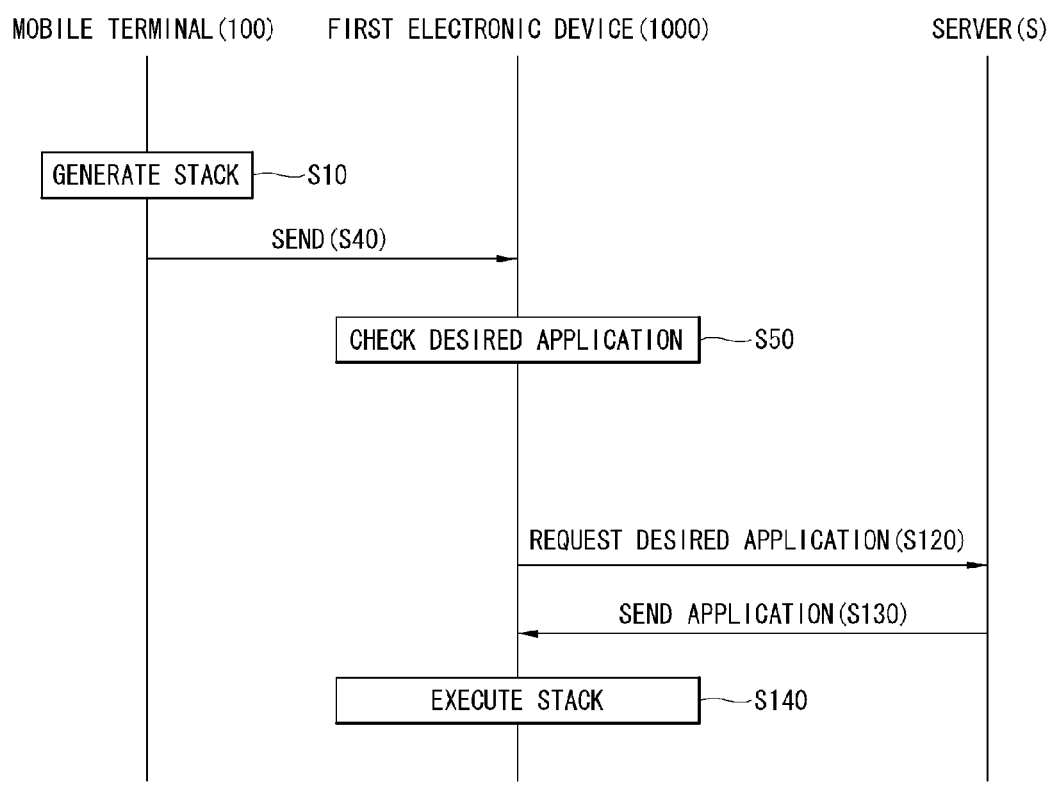

FIGS. 14 and 15 are views illustrating relationship between the mobile terminal illustrated in FIG. 1 and another electronic device in terms of the transmission of an application.

As shown in FIG. 14(a), the mobile terminal 100 according to an embodiment of the present invention generates a stack in operation S10, and sends the stack to the first electronic device 1000. Meanwhile, the mobile terminal 100 may send an application to the first electronic device 1000 in operation S49.

The application may be an application required to smoothly perform the sent stack. For example, in order to reproduce a music file, an application allowing for the reproduction of the music file may be sent together with the stack.

FIG. 14(b), the mobile terminal 100 may send the generated stack in operation S40 and send application information in operation S41.

The application information may be information regarding an application for facilitating the execution of the transmitted stack. For example, in the case of reproducing a music file, the information may be information indicating which application the music file can be reproduced in.

The first electronic device 1000 receiving the application information may determine whether or not the corresponding application exists in the first electronic device 1000. When the corresponding application does not exist in the first electronic device, the first electronic device 1000 may request a desired application from the mobile terminal 100 in operation S43.

When receiving the request for the desired application, the mobile terminal 100 may send the application to the first electronic device 1000 in operation S49.

As shown in FIG. 15, the first electronic device 1000 receiving the stack from the mobile terminal 100 may acquire a desired application from another electronic device such as a server S.

The first electronic device 1000 receiving the stack may check the desired application in operation S110.

The first electronic device 1000, which has checked the desired application to perform a task included in the stack, may request the desired application from a server S in operation S120 if there is one. For example, this means that in the case where the desired application for a picture taking task included in the stack does not exist, the application may be requested and acquired from the server S.

The server S receiving the request for the application from the first electronic device 1000 may send the application to the first electronic device 1000 in operation S130.

The first electronic device 1000 receiving the application may execute the stack by using the application in operation S140.

Figure 16:
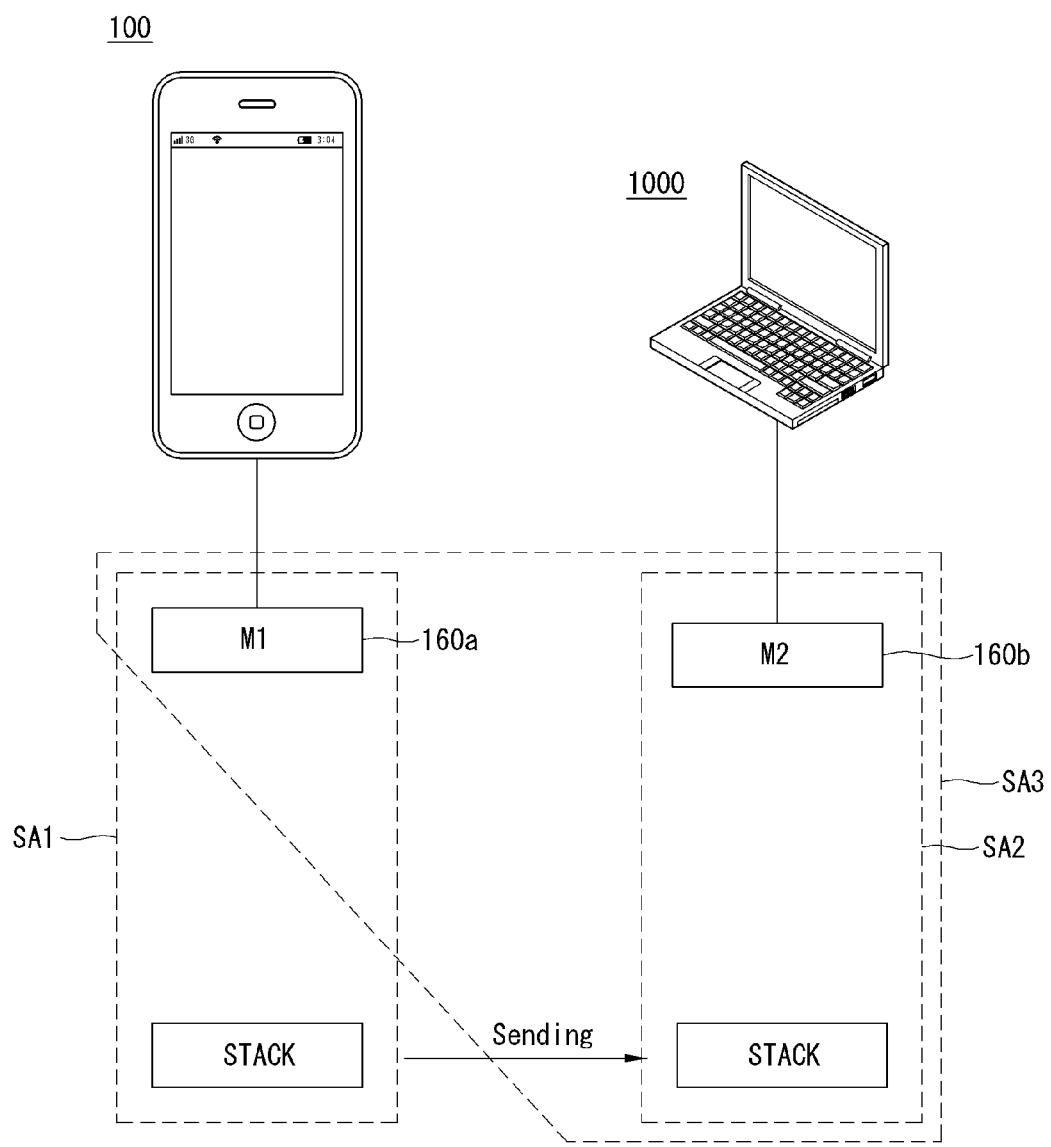
FIG. 16 is a view illustrating memory share between the mobile terminal illustrated in FIG. 1 and another electronic device.

FIG. 16 is a view illustrating memory sharing between the mobile terminal illustrated in FIG. 1 and another electronic device.

As shown therein, the mobile terminal 100 according to an embodiment of the present invention may include a first memory 160a, and the first electronic device 1000 may include a second memory 160b.

In the case where the mobile terminal 100 generates a stack and performs an associated operation, access via the corresponding stack may be access to a memory corresponding to a first area SA1. That is, this means that access to data included in the first memory 16a may be made via the currently generated stack.

In the case where the stack is transmitted to the first electronic device 1000, data accessible via the corresponding stack may be in a memory included in a second area SA2 or a third area SA3.

The second area SA2 may be a second memory 160b included in the first electronic device 1000. That is, this means that access to the second memory 160b included in the first electronic device 100 receiving the stack can be made.

The third area SA3 may include the first memory 160a of the mobile terminal 100 and the second memory 160b of the first electronic device 1000. That is, this means that access to the second memory 160b of the first electronic device 1000 receiving the stack and to the first memory 160a of the mobile terminal 100 sending the stack can be made.

Assuming an application displaying an image included in a memory, the above situation can be more clearly understood. If access to data included in the first area SA1 can be made, this means that an image included in the first memory M1 can be displayed. If access to data included in the second area SA2 can be made, this means that an image included in the second memory M2 can be displayed. If access to data included in the third area SA3 can be made, this means that an image included in the first and second memories M1 and M2 can be displayed. In this case, access to a memory included in another electronic device can be performed through a radio communication unit 110.

FIGS. 17 through 18 are views illustrating another electronic device displaying a stack being received.

As shown therein, a display 1051 of the first electronic device receiving the stack may display information associated with the received stack.

As shown in FIG. 17(a), the display 105 of the first electronic device may display contents indicating that a stack is being received.

As shown in FIG. 17(b), the display 1051 of the first electronic device may display a popup window to check whether to display concrete contents of an acquired stack.

As shown in FIG. 18(a), stack configuration may be displayed on the display 1051 of the first electronic device depending on a user's selection. For example, the names of tasks constituting the stack may be displayed.

The user may select and execute a specific task in the stack being displayed or the specific task may be arbitrarily removed from the stack. For example, when task BT1 is selected, a function corresponding to the task BT1, which is not the uppermost task, may be executed. Also, task CT1 is selected and a touch motion of grading the CT1 task to the right or left may delete the CT1 task.

As shown in FIG. 18(b), contents of acquired stacks may be displayed on the display 1051 of the first electronic device. That is, the first electronic device may receive a plurality of stacks from other electronic devices. When a specific stack is selected, a task corresponding to the selected stack can be executed.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display configured to display information;
a radio communication unit configured to receive and transmit information;
a memory configured to store information; and
a controller configured to:
generate a stack comprising at least one part corresponding to a first ordered portion of performing a specific function;
perform a first part of the stack and modify the stack to indicate that the first part of the stack is performed;
cause the radio communication unit to transmit the stack to at least one external electronic device in response to selection of the at least one external electronic device;
receive a modified stack from the at least one external electronic device indicating that a second part of the stack corresponding to a second ordered portion of the specific function has been performed; and
perform a third part of the modified stack corresponding to a third ordered portion of the specific function
wherein the specific function is completed after the first part is performed by the mobile terminal, the second part is performed by the at least one external terminal and the third part is performed by the mobile terminal.

2. The mobile terminal of claim 1, wherein the controller is further configured to cause the radio communication unit to transmit application data associated with the specific function to the at least one external electronic device.

3. The mobile terminal of claim 2, wherein the application data comprises at least application contents corresponding to at least one part included in the stack, or path data for acquiring application contents corresponding to at least one part included in the stack.

4. The mobile terminal of claim 2, wherein the controller is further configured to cause the radio communication unit to transmit the application data in response to a request received from the at least one external electronic device.

5. The mobile terminal of claim 1, wherein the controller is further configured to perform one or more functions each related to an ordered part of the specific function, wherein the one or more functions are performed in a reverse order in which each related part was added to the stack.

6. The mobile terminal of claim 1, wherein the stack further comprises a plurality of parts each corresponding to one of a plurality of applications.

7. A control method of a mobile terminal, the control method comprising:
generating a stack comprising at least one part corresponding to a first ordered portion of performing a specific function;
performing a first part of the stack and modifying the stack to indicate that the first part of the stack is performed;
transmitting the stack to at least one external electronic device via a radio communication unit in response to selection of the at least one external electronic device;
receiving a modified stack from the at least one external electronic device indicating that a second of the stack corresponding to a second ordered portion of the specific function has been performed; and
performing a third part of the modified stack corresponding to a third ordered portion of the specific function
wherein the specific function is completed after the first part is performed by the mobile terminal, the second part is performed by the at least one external terminal and the third part is performed by the mobile terminal.

8. The control method of claim 7, further comprising transmitting application data associated with the specific function to the at least one external electronic device.

9. The control method of claim 8, wherein the application data comprises at least application contents corresponding to at least one part included in the stack, or path data for acquiring application contents corresponding to at least one part included in the stack.

10. The control method of claim 8, wherein the application data is transmitted in response to a request received from the at least one external electronic device.

11. The control method of claim 7, further comprising performing one or more functions each related to an ordered part of the specific function, wherein the one or more functions are performed in a reverse order in which each related part was added to the stack.

\* \* \* \* \*